July 13, 1965 E. ANDERSEN 3,194,915
DIFFERENTIAL PRESSURE-AND MANUALLY OPERATED
SAFETY SWITCH ARRANGEMENT
Filed Jan. 16, 1962
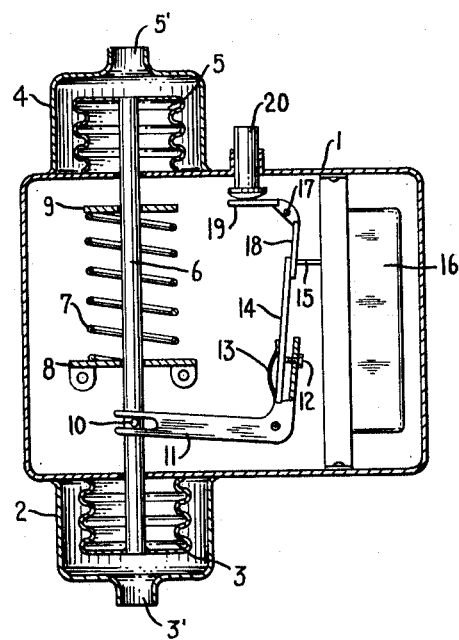

United States Patent Office 3,194,915
Patented July 13, 1965

3,194,915
DIFFERENTIAL PRESSURE AND MANUALLY
OPERATED SAFETY SWITCH ARRANGEMENT
Erik Andersen, Nordborg, Denmark, assignor to Danfoss
ved ing. M. Clausen, Nordborg, Denmark, a company
of Denmark
Filed Jan. 16, 1962, Ser. No. 173,850
3 Claims. (Cl. 200—83)

This invention relates to a differential pressure-control unit, and is more particularly concerned with a differential pressure-control unit of the type in which a main switch is coupled into the circuit of a safety switch which is actuated in response to the current flowing through the main switch.

Differential pressure-control units of the character indicated are used, for example, to control the lubrication of a compressor. One pressure element of the unit measures the pressure of the oil pump and the other pressure element measures the pressure in the crank case. During operation, the pressure of the oil pump must be higher than the pressure in the crank case. If the difference in pressure drops below the proper value, the main switch of the pressure-control unit will be closed and the heating-coil of the safety-switch, which is connected in series with the main switch of the differential pressure control unit, will be heated. The safety-switch can, for example, be of the bi-metal type, with the bi-metal element heated by the heating-coil. After 60 to 90 seconds the safety-switch will cut off the current to the driving motor of the compressor.

Unfortunately, the safety-switch is one of the most sensitive parts of an otherwise sturdy compressor unit. The heating-coil, for example, is susceptible to rupture. It has not heretofore been possible to test with certainty the effectiveness and operability of the safety-switch to determine whether or not it has failed and may need replacement.

It is accordingly an object of the invention to provide a differential pressure-control unit provided with means for testing the operability of the safety switch at any time.

It is a further object of the invention to provide means of the character indicated which is effective regardless of the pressure conditions prevailing in the differential pressure-control unit.

In accordance with the invention there is provided in a differential pressure-control unit comprising a manually-actuatable assembly by means of which the safety switch can be actuated independently of the position in which the elements of the control unit may be. By means of the construction of this invention, a simple manual operation is effective to actuate the safety-switch in the same manner in which it would be actuated in the event of a malfunction in the system in which the differential pressure control unit is used, so that the operability of the safety switch can be accurately checked at any time.

The manually-actuatable means of this invention may be a manually-actuatable switch connected to the safety switch in parallel with the main switch of the pressure control unit. Preferably, however, the manually-actuatable assembly includes means for manually operating the main switch of the pressure control unit. For this purpose, a push-button-operated lever is disposed in the path of the lever system of the pressure control unit which is provided to actuate the main switch of the unit.

Other objects and features of the invention will be apparent from the following detailed description thereof which is given with particular reference to a specific embodiment taken in connection with the drawing in which is shown, schematically and in cross-section, a differential pressure-control unit embodying features of the present invention.

Referring to the drawing, a housing 1 supports a first pressure unit 2, which contains a bellows 3, and a second pressure unit 4, which contains a bellows 5. The pressure unit 2 communicates with the crank case (not shown) through the port 3', and the pressure unit 4 communicates with the oil pump (not shown) through the port 5'. Pressure transfer between the crank case and the bellows 3, and between the oil pump and the bellows 5, takes place by means of a non-compressible fluid, in conventional manner. The two bellows 3 and 5 are connected to each other by means of a rod 6. A spring 7, which bears against a stop 8 rigid with casing 1, and against a stop 9 carried by the rod 6, biases the rod 6 upwardly, as can be seen in the drawing. The rod 6 carries a pin 10 which is engaged by an angular lever 11 which, through the adjusting screw 12, acts upon an operating lever 14. The operating lever 14 is supported and pressed against the screw 12 by means of a leaf-spring 13. Lever 14 is positioned to press the switch-rod 15 of the main switch 16.

To provide the manual control which is possible in accordance with the present invention, an angular lever 17 is pivoted in the casing 1 and has one leg 18 disposed between the end of operating lever 14 and the switch-rod 15 and has its other leg 19 disposed in the path of a push-button 20.

During normal operation of the compressor (not shown) the pressure from the oil pump which is transferred to the bellows 5 of the pressure unit 4 prevails over the pressure in the crank case, and the elements in the device described assume the positions shown in the drawing. If the pressure in the crank case increases, as a result of a malfunction of some kind, the pressure acting upon the bellows 3 of the pressure unit 2 will, of course, increase. The rod 6 will be displaced upwardly, and the lever-rod system 11–14 will be actuated, with the lever 11 pivoting in a clock-wise direction. As a result, the switch-rod 15 will be bent downwardly and the switch 16 will be closed. After a predetermined period of time, the safety-switch (not shown) will cut off the current to the driving motor for the compressor.

To test the safety-switch to determine if it is functioning properly, it is merely necessary to press down the push-button 20. This will pivot the lever 17 in a counter-clockwise direction and will have the effect of actuating the switch-lever 15 in the same manner as it is actuated by the pressure control lever rod system 11–14 in the case of a malfunction, as described above.

It will, of course, be understood that the several individual components referred to above, e.g. the safety-switch with its heating-coil and bi-metal element and the pressure transfer means from the oil pump and the crank case, and the main switch of the differential pressure control unit, and the like, are suitably of conventional construction, unless otherwise indicated. A typical safety-switch is described, for example, in U.S. Patent No. 2,793,268, and a differential pressure control system is shown, for example, in U.S. Patent No. 2,519,596. A typical switch assembly for a differential control unit is described in U.S. Patent No. 2,255,666. Indeed, the construction of the present invention is applicable to various known differential pressure control devices and is in no way limited to the specific device illustrated. A typical pressure control device with which the invention may be utilized is shown, for example, in U.S. Patent No. 2,200,970.

It will be understood that various changes and modifications may be made in the embodiment described above and illustrated in the drawing without departing from the scope of the invention as defined in the appended claims. It is intended, therefore, that all matter contained in the foregoing description and in the drawing shall be interpreted as illustrative only and not as limitative of the invention.

I claim:

1. A switch arrangement comprising, a switch member operable to a first position for effecting closing of a circuit and operable to a second position for effecting opening of said circuit, said switch member being disposed normally in said second position, a differential pressure control unit comprising a first pressure-sensing system for sensing a first fluid pressure and responding thereto and a second pressure-sensing system for sensing a second fluid pressure and reponding thereto, means connected to said first and second pressure-sensing system for actuation in one direction by said systems in response to a given pressure difference between said two fluid pressures being sensed, a lever system connected to the last-mentioned means for actuation to a position for actuating said switch member to said first position, in response to said given pressure difference, and manual means coupled to said lever system for operation of said switch member to said first position independently of said differential pressure control unit sensing systems for periodically at will testing the actuation of said switch member to said first position by said lever system.

2. A switch arrangement according to claim 1 in which each pressure-sensing system comprises a pressure-responsive bellows, and in which said means connected to said systems comprises a rod operable axially by said two bellows and including means biasing said rod in a direction opposite to said one direction.

3. A switch arrangement according to claim 2, in which said lever system comprises a pair of coupled pivotally mounted levers, one of said levers being operable independently of the other by said manual means, said manual means comprising a push button engaged with said one lever.

References Cited by the Examiner
UNITED STATES PATENTS

| | | | |
|---|---|---|---|
| 1,553,268 | 9/25 | Romano | 200—159 |
| 1,877,327 | 9/32 | Ingersoll | 200—140 |
| 1,934,605 | 11/33 | Tarleton | 200—140 |
| 1,954,425 | 4/34 | Place et al. | 200—83 |
| 2,196,443 | 4/40 | Maynard | 200—122 |
| 2,226,325 | 12/40 | Sandford | 200—83 |
| 2,302,923 | 11/42 | Zimarik | 200—153 |
| 2,474,369 | 6/49 | Ray | 200—81 |
| 2,489,422 | 11/49 | Kuhn | 200—83 |
| 2,519,596 | 8/50 | Oliveau | 200—81 |
| 2,727,115 | 12/55 | Vissier et al. | 200—140 |
| 2,818,480 | 12/57 | Barker | 200—153 |
| 3,071,665 | 1/63 | Leupold | 200—122 |

BERNARD A. GILHEANY, *Primary Examiner.*

WALTER STOLWEIN, *Examiner.*